United States Patent Office 3,046,288
Patented July 24, 1962

---

3,046,288
CYCLOPENTADIENYL-METAL HALIDES AND METHOD OF MAKING
Carol L. Sloan, Yonkers, N.Y., and William A. Barber, Springdale, Conn., assignors to American Cyanamid Company, New York, N.Y., a corporation of Maine
No Drawing. Filed Oct. 29, 1957, Ser. No. 693,030
2 Claims. (Cl. 260—429.5)

This invention relates broadly to new chemical compounds and, more particularly, to cyclopentadienyl-metal halides and to a method of making the same. Still more particularly, the invention is concerned with the production of cyclopentadienyltitanium trihalides.

The compounds of the present invention may be represented by the general formula (I)
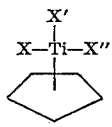

wherein X, X' and X" each represent a halogen selected from the class consisting of chlorine, bromine and iodine. Compounds embraced by Formula I are cyclopentadienyltitanium trichloride, $C_5H_5TiCl_3$, and having the structural formula (II)
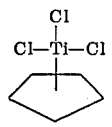

cyclopentadienyltitanium tribromide, $C_5H_5TiBr_3$, and cyclopentadienyltitanium triiodide, $C_5H_5TiI_3$.

To the best of our knowledge and belief compounds of the kind embraced by Formula I, and which contain only one cyclopentadienyl grouping or ring per molecule, were unknown prior to the present invention. The prior art discloses compounds containing only one cyclopentadienyl ring per molecule only in cases where —CO or —NO groups are also present in the molecule or where the metal atom is part of a chelate ring. The dicyclopentadienyltitanium chloride, bromide and iodide are known, and exemplify so-called (because of their structure) "sandwich" compounds. Thus the structural formula for dicyclopentadienyltitanium dichloride is (III)
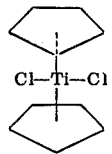

Wilkinson et al. [J.A.C.S., 76, 4281 (1954)] produced dicyclopentadienyltitanium dichloride by reaction between 0.075 mole of titanium tetrachloride and 0.2 mole of cyclopentadienylsodium in tetrahydrofuran; dicyclopentadienyltitanium dibromide, by reaction between 0.075 mole of titanium tetrachloride and 0.4 mole of cyclopentadienylmagnesium bromide in benzene-ether; and dicyclopentadienyltitanium diiodide, by reaction between dicyclopentadienyltitanium dibromide and excess potassium iodide in acetone.

The compounds of the present nvention are useful as, for example, polymerization catalysts and as intermediates in the preparation of other compounds including organotitanium compounds and titanium-containing polymers. In general, they are characterized by being more susceptible to hydrolysis, by a lower melting point and by being more soluble in organic solvents than the corresponding dihalides. They crystallize very slowly from solvents and are generally orange or orange-brown in color as compared with the red to purple colors of the prior-art dicyclopentadienyltitanium dichloride, dibromide and diiodide.

It is a primary object of the present invention to provide a new class of chemical compounds, more particularly organometallic compounds, for use in industry.

A more specific object of the invention is to provide cyclopentadienyltitanium trichloride, tribromide and triiodide as new and useful chemical compounds, and a method of making the same.

Other objects of the invention will be apparent to those skilled in the art from the following more detailed description and the illustrative examples.

The objects of the invention are attained by preparing compounds of the kind embraced by Formula I. One method of preparing these compounds is by effecting reaction between (1) a titanium tetrahalide represented by the general formula (IV)
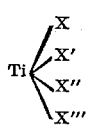

wherein X, X', X" and X''' each represent a halogen selected from the class consisting of chlorine, bromine and iodine and (2) an ionic cyclopentadienyl compound represented by the general formula (V) 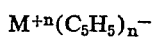

wherein M represents a metal of the class consisting of the alkali metals (sodium, potassium, lithium, rubidium and caesium) and magnesium, and $n$ represents an integer which is the same as the valence of the metal represented by M. The tetrahalide of (1) is employed in an amount corresponding to at least about one mole thereof (e.g., from 1 to 2 moles thereof) for each $C_5H_5$ ion in the cyclopentadienyl compound of (2). No particular advantages ordinarily accrue by using more than about 1.1 moles of the tetrahalide of (1) for each of the aforesaid $C_5H_5$ ions.

The reaction is effected under anhydrous conditions and, advantageously, while the reactants are contained in an inert (substantially completely inert), anhydrous (substantially completely anhydrous), liquid medium. By "inert" or "substantially completely inert" anhydrous, liquid medium is meant an anhydrous liquid medium which is so inert or non-reactive toward the reactants and the reaction product (i.e., the cyclopentadienyltitanium trihalide) that it will not affect the course of the reaction or the constitution of the reaction product. By "anhydrous" or "substantially completely anhydrous" liquid medium in the foregoing sentences is meant one which contains no more than a trace of water, and by "liquid medium" is meant a medium which is liquid at the temperature and pressure employed in effecting the reaction. In other words, the inert, anhydrous, liquid medium in which the reaction advantageously is effected may or may not be a liquid at room temperature or at any other temperature below the reaction temperature. Preferably a liquid medium which is volatile (volatilizable) without decomposition is employed.

Illustrative examples of titanium tetrahalides embraced by Formula IV are titanium tetrachloride, titanium tetrabromide, titanium tetraiodide and the various available (or capable of preparation by known methods) mixed tetrahalides (chloro, bromo and iodo derivatives) of titanium, e.g., $TiCl_2I_2$, $TiClI_3$, $TiCl_3I$, etc.

Illustrative examples of inert, anhydrous liquid media (solvents or diluents) that can be employed are benzene, toluene, xylene, tetrahydrofuran, diethyl ether, diglycoldimethyl ether, etc. The amount of inert, anhydrous, liquid reaction medium employed may be varied as desired or as conditions may require, but ordinarily the amount thereof is such that the reactants constitute from about 1% to about 20% by weight thereof.

The temperature at which the reaction is effected, with or without a catalyst, can be varied over a wide range, for instance at temperatures ranging from room temperature (20°–30° C.) up to the decomposition temperature of the reaction product. Ordinarily the reaction is effected at the boiling or reflux temperature of the reaction mass at atmospheric pressure. Superatmospheric pressures can be employed when it is desired to effect the reaction at a temperature above the boiling temperature of the reaction mass at atmospheric pressure.

The reaction mass advantageously is kept in the dark during the reaction period, since solutions of the reaction product are sensitive to light.

At the end of the reaction period the cyclopentadienyltitanium trihalide is isolated from the reaction mass by any suitable means or combination of means (keeping in mind its sensitivity to hydrolysis), e.g., by filtration, centrifuging, decantation, etc., and the isolated product (if insufficiently pure) is then purified, e.g., by washing with petroleum ether or other inert, anhydrous, organic liquid and one or more recrystallizations from, for example, toluene, xylene, chloroform, etc., as desired or as may be required.

In order that those skilled in the art may better understand how the present invention can be carried into effect, the following examples are given by way of illustration and not by way of limitation. All parts and percentages are by weight unless otherwise stated.

*Example 1*

Cyclopentadienyltitanium trichloride is prepared in an inert atmosphere (e.g., nitrogen, argon, helium, etc.) by the reaction of titanium tetrachloride with dicyclopentadienylmagnesium in xylene solution. The orange-colored, solid product partially crystallizes out and can be filtered off. The remainder is obtained by concentrating the xylene solution and allowing the product to crystallize. Goods yields of high-purity material are obtained. A more detailed description follows:

Into a three-necked, round-bottomed flask fitted with a gas inlet (through which nitrogen is passed to purge the flask of air and during the entire reaction period), a stirrer, and a two-necked adapter holding a dropping funnel and a reflux condenser fitted with a gas outlet, is poured approximately 600 ml. of a xylene solution containing 21.3 g. of dicyclopentadienylmagnesium. To this is added, over a period of 30 minutes, approximately 52 g. of $TiCl_4$ dissolved in about 30 ml. of xylene. An ice-water bath is used to cool the flask during addition. The reaction mass is then maintained at reflux for 3½ hours.

When the apparatus has cooled, it is opened and the xylene solution containing finely divided black, non-crystalline material is decanted off into a filter. The orange-colored crystals of $TiC_5H_5Cl_3$ remaining in the flask are slurried with petroleum ether (B.P. 30°–60° C.) and poured onto a Büchner funnel where they are washed several times with petroleum ether and dried. The clear, red-orange solution is evaporated in a simple distillation apparatus to half its volume and seeded with previously obtained crystals of pure product. On cooling, large orange-colored crystals of additional product form in the mother liquor. The total yield of cyclopentadienyltitanium trichloride, based on the dicyclopentadienylmagnesium, is 78.2% of the theoretical.

The product is stored in an inert atmosphere. Though it is fairly stable in air, a yellow coating of hydrolysis product will form on the surface of the crystals if they are left exposed to moist air for a short period.

*Example 2*

In this example the order of addition to reactants is reversed from that of Example 1. More particularly, it is the same as Example 1 except that 30 ml. (52 g.) of $TiCl_4$ dissolved in about 100 ml. of xylene is placed in the flask. To this is added, over a period of 40 minutes, 22.2 g. of dicyclopentadienylmagnesium dissolved in about 525 ml. of xylene. The yield of cyclopentadienyltitanium trichloride, based on the dicyclopentadienylmagnesium, is 51% of the theoretical.

The $TiC_5H_5Cl_3$ can be recrystallized from xylene. It forms bright orange crystals, M.P. 140°–142° C. The pure product gives a good elemental analysis. Calculated for $TiC_5H_5Cl_3$: C, 27.37; H, 2.30; Cl, 48.48; Ti, 21.83. Found: C, 27.72; H, 2.65; Cl, 48.42; Ti, 21.8 (titanium analysis by visible spectroscopy, chlorine by Volhard method); molecular weight by boiling point in $CHCl_3$, calculated: 219.3, found 224.

*Example 3*

Same procedure as in Example 2 except that 22.8 g. of $TiBr_4$ dissolved in about 100 ml. of xylene is placed in the flask. To this is added over a period of 15 minutes a solution of 4.8 g. of dicyclopentadienylmagnesium dissolved in about 150 ml. of xylene. The mixture is refluxed for 2¾ hours.

The product, $TiC_5H_5Br_3$, is isolated in essentially the same manner described under Example 1 with reference to the isolation of $TiC_5H_5Cl_3$. The isolated product is an orange-brown, crystalline solid; M.P. 163°–165° C.

*Example 4*

The same procedure is followed as in Example 2 except that 25 g. of $TiI_4$ dissolved in 200 ml. of xylene is placed in the flask. To this is added, over a period of 20 minutes, 34.5 ml. of a 0.67 M solution of dicyclopentadienylmagnesium in xylene. The mixture is refluxed for 4½ hours.

The product, $TiC_5H_5I_3$, is isolated in essentially the same manner described under Example 1 with reference to the isolation of $TiC_5H_5Cl_3$. The isolated solid is a brown, crystalline material; M.P. 185°–190° C.

*Example 5*

Same procedure as in Example 2 except that 16 ml. (27.7 g.) of $TiCl_4$ dissolved in about 200 ml. of xylene is placed in the flask. To this is added, over a period of 5–10 minutes, 25 ml. of a 2.16 M solution of cyclopentadienylsodium ($NaC_5H_5$) in tetrahydrofuran, and the mixture is stirred at room temperature for 1 hour. An orange-brown solution results, from which a small yield of cyclopentadienyltitanium trichloride is obtained.

Instead of cyclopentadienylsodium, one may substitute an equivalent amount of other cyclopentadienyl-alkali metals.

Instead of dicyclopentadienylmagnesium or cyclopentadienylsodium used in Examples 1–5, an equivalent amount of the corresponding calcium, strontium or barium derivative might be used.

*Example 6*

To 50 ml. of inhibitor-free styrene in a suitable container is added 50 mg. of cyclopentadienyltitanium trichloride as a polymerization catalyst. The container is tightly closed and allowed to stand for 5 hours at room temperature. At the end of this time, the contents of the container are poured into methanol, giving a precipitate of polystyrene.

The compounds of the present invention, e.g., $$TiC_5H_5Cl_3$$

may be reduced to one or more of the compounds of a lower state of oxidation, e.g., to $TiC_5H_5Cl_2$, $TiC_5H_5Cl$, and such compounds may be used as polymerization catalysts or as components of a polymerization-catalyst system.

Hydrolysis products of the compounds embraced by Formula I also can be produced, that is, compounds wherein one or more of the Cl, Br or I atoms of the compound have replaced by an —OH group or groups, thereby to yield compounds with a Ti—OH bond that have useful properties and are valuable in industry. The halogen atoms (any or all of them) in the compounds of this invention also may be replaced by a hydrocarbon grouping, e.g., an alkyl (including cycloalkyl), alkenyl, aryl, alkaryl, aralkyl or aralkenyl grouping, by reaction with the corresponding Grignard reagent or lithium compound, to provide new and useful compounds; and when such compounds are produced that contain an unsubstituted halogen atom or atoms the latter, in turn, can be hydrolyzed to yield a compound which also contains one or more —OH groups bonded directly to titanium. The compounds containing vinyl, allyl and other polymerizably-reactive, ethylenically unsaturated groups are polymerizable to new and useful titanium-containing polymers.

Solutions of $TiC_5H_5Cl_3$ and other compounds of this invention are sensitive to visible light and decompose in time when so subjected, for example in a matter of hours in strong sunlight. This light-sensitivity suggests free-radical production and, hence, general activity as a polymerization catalyst. Other free-radical reactions may also take place, e.g., addition to olefins or reaction with other organic compounds.

We claim:
1. The method of preparing a compound represented by the general formula

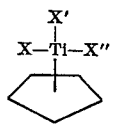

wherein X, X' and X" each represent a halogen selected from the class consisting of chlorine, bromine and iodine, said method comprising effecting reaction between (1) a titanium tetrahalide represented by the general formula

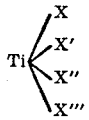

wherein X, X', X" and X'" each have the same meaning stated above for X, X' and X" in the first-given formula and (2) dicyclopentadienylmagnesium, the tetrahalide of (1) being employed in an amount corresponding to at least two moles thereof for each mole of dicyclopentadienylmagnesium, and said reaction being effected under anhydrous conditions, while the said reactants are contained in an inert, anhydrous, liquid medium and at a temperature ranging from about 20° C. up to the decomposition temperature of the reaction product; and isolating a product represented by the first-given formula from the resulting reaction mass.

2. A method as in claim 1 wherein the compound of (1) is titanium tetrachloride.

References Cited in the file of this patent
UNITED STATES PATENTS
2,818,416     Brown et al. _____ Dec. 31, 1957

OTHER REFERENCES
Herman et al.: "J.A.C.S.," 75, pages 3882–3887 (1953).
Wilkinson et al.: "Journal of Inorganic and Nuclear Chemistry," vol. 2, No. 2, pages 95–113, February 1956.